United States Patent
Leonard et al.

(10) Patent No.: US 9,127,737 B2
(45) Date of Patent: Sep. 8, 2015

(54) UNREINFORCED ELASTOMERIC SPRING WALL, GAS SPRING AND METHOD

(75) Inventors: Joshua R. Leonard, Noblesville, IN (US); Pradipta N. Moulik, Carmel, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 924 days.

(21) Appl. No.: 12/778,448

(22) Filed: May 12, 2010

(65) Prior Publication Data

US 2010/0289197 A1  Nov. 18, 2010

Related U.S. Application Data

(60) Provisional application No. 61/177,381, filed on May 12, 2009.

(51) Int. Cl.
*F16F 9/04* (2006.01)
*B60G 11/27* (2006.01)

(52) U.S. Cl.
CPC .............. *F16F 9/0409* (2013.01); *B60G 11/27* (2013.01); *B60G 2202/152* (2013.01); *F16F 9/0445* (2013.01); *Y10T 29/49877* (2015.01)

(58) Field of Classification Search
CPC .............................. F16F 9/0445; F16F 9/0409
USPC .......................................... 267/64.14–64.28
See application file for complete search history.

(56) References Cited

U.S. PATENT DOCUMENTS

| | | | |
|---|---|---|---|
| 3,727,899 A | 4/1973 | Pemberton | |
| 4,235,427 A * | 11/1980 | Bialobrzeski | 267/153 |
| 4,763,883 A * | 8/1988 | Crabtree | 267/64.27 |
| 5,346,187 A * | 9/1994 | Drescher | 267/64.11 |
| 6,199,837 B1 | 3/2001 | Leonard et al. | |
| 6,612,223 B2 | 9/2003 | Leonard et al. | |
| 6,719,279 B1 | 4/2004 | Koch et al. | |
| 7,784,771 B2 * | 8/2010 | Leonard et al. | 267/64.27 |
| 8,240,643 B2 * | 8/2012 | Hock | 267/64.27 |
| 8,286,473 B2 * | 10/2012 | Rensel et al. | 73/146 |
| 2005/0206053 A1* | 9/2005 | Schneider | 267/64.27 |
| 2011/0083500 A1* | 4/2011 | Rensel et al. | 73/117.03 |

FOREIGN PATENT DOCUMENTS

DE  10007153 A1 *  9/2001  ................ F16F 9/05

OTHER PUBLICATIONS

Machine translation of DE10007153.*
Machine translation of DE 10007153, retrieved May 2013.*

* cited by examiner

*Primary Examiner* — Bradley King
(74) *Attorney, Agent, or Firm* — Jason A. Houser; Fay Sharpe LLP

(57) ABSTRACT

A spring wall for securement between associated end members for forming an associated gas spring assembly includes a first wall portion that extends axially along a longitudinal axis and circumferentially thereabout. The first wall portion is formed from an unreinforced elastomeric material, and the first wall portion has a first nominal stiffness value. A second wall portion extends along the longitudinal axis and circumferentially thereabout. The second wall portion is disposed in longitudinal relation to the first wall portion and has a second nominal stiffness value that is different from the first nominal stiffness value of the first wall portion such that a non-constant stiffness profile is established along a longitudinal length of the spring wall. A gas spring and a gas spring and reservoir assembly utilizing such a spring wall as well as a method of manufacturing a gas spring are also included.

20 Claims, 14 Drawing Sheets

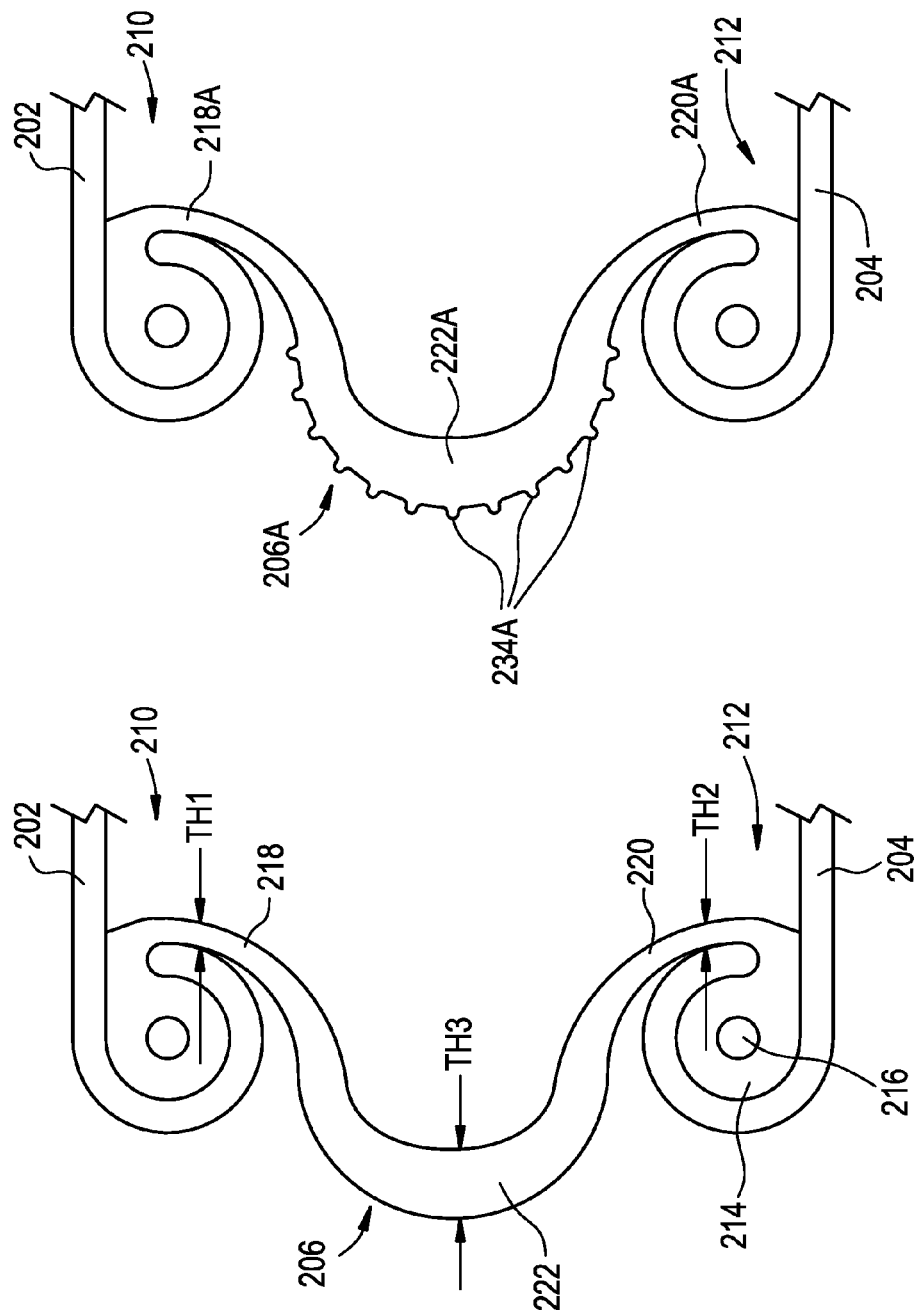

UNREINFORCED ELASTOMERIC SPRING WALL, GAS SPRING AND METHOD

BACKGROUND

The present disclosure broadly relates to the art of gas spring devices.

Gas spring devices of the subject disclosure find particular application and use in conjunction with suspension systems of wheeled vehicles, and will be described herein with specific reference thereto. However, gas spring devices of the present disclosure are also amenable to use in other applications and environments. Thus, it is to be understood that the specific uses shown and described herein are merely exemplary.

It is well known that land vehicles of most types and kinds are outfitted with a suspension system that supports a sprung mass (e.g., a body or chassis) of the vehicle on an unsprung mass (e.g., axles or wheel-engaging members) of the vehicle. It is also well known for some suspension systems to include gas spring devices that are operatively connected between the sprung and unsprung masses of the vehicle. Typically, such gas spring devices include two relatively rigid end members that are sealingly connected to respective open ends of a spring wall to at least partially form a spring chamber therebetween. The end members of such gas spring assemblies are often constructed of metal. However, in some constructions a substantially rigid plastic material has been used.

The spring wall of a conventional gas spring device is adapted to flex during dynamic operation and use of the gas spring device and is therefore normally made from a flexible, elastomeric material. During operation, the gas spring device is loaded such that opposing forces act against the end members. It is well recognized in the art that the spring wall does not itself support the load. Rather, the pressurized gas retained within the gas spring device by the spring wall acts against the end members and thereby provides forces capable of supporting loads applied to the end members.

To withstand the forces applied thereto by the aforementioned pressurized gas, existing spring walls generally include internal and/or external reinforcement in the form of additional materials and/or structures. Such internal and/or external reinforcement acts to buttress the elastomeric material of the spring wall and thereby help to restrict the expansion of the same, both under internal design pressures and under dynamic pressure levels associated with use under load. For example, some known wall constructions include internal structures in the form of reinforcement filaments or cords that are embedded in the material from which the spring wall is constructed. Other known spring wall constructions are used in association with external structures, such as a coil spring or a restraining cylinder, for example, that is disposed about at least a portion of the outer surface of the spring wall.

Notwithstanding the success and common usage of conventional gas spring constructions, certain areas of improvement in the art of gas spring devices still remain. One such area involves the reduction of manufacturing costs associated with the production of known spring walls. Typically, the manufacture of internally-reinforced spring walls involves a multitude of fabrication steps and processes that undesirably increase costs associated with the production thereof. Conversely, spring walls that utilize only external reinforcement are often less costly to manufacture. However, the costs associated with the attendant external reinforcement components (e.g., manufacturing, inventory and/or assembly costs) typically more than offset any cost savings associated with the flexible spring wall. What's more, the use of external reinforcement components and/or structures often raises other undesirable issues, such as increased wear and/or heat retention, for example. Furthermore, only a limited number of applications and/or environments are suitable for the use of such external reinforcement components.

Accordingly, it is believed desirable to develop unreinforced elastomeric spring walls for use in forming gas spring assemblies that overcome the foregoing and other disadvantageous qualities and/or characteristics associated with internally or externally reinforced spring walls.

BRIEF DESCRIPTION

A spring wall in accordance with the subject matter of the present disclosure for securement between associated end members for forming an associated gas spring assembly includes a first wall portion that extends axially along a longitudinal axis and circumferentially thereabout. The first wall portion is formed from an unreinforced elastomeric material, and the first wall portion has a first nominal stiffness value. A second wall portion extends along the longitudinal axis and circumferentially thereabout. The second wall portion is disposed in longitudinal relation to the first wall portion and has a second nominal stiffness value that is different from the first nominal stiffness value of the first wall portion such that a non-constant stiffness profile is established along a longitudinal length of the spring wall.

A spring wall according to the foregoing paragraph can include the unreinforced elastomeric material of the second wall portion being different than the unreinforced elastomeric material of the first wall portion.

A spring wall according to the foregoing paragraph can include the unreinforced elastomeric material of the first wall portion being from a first thermoplastic elastomer and the unreinforced elastomeric material of the second wall portion being from a second thermoplastic elastomer that is different from the first thermoplastic elastomer.

A spring wall according to the foregoing paragraph can include the first wall portion being formed from the first thermoplastic elastomer and the second wall portion that is formed from the second thermoplastic elastomer being secured together in abutting engagement at a common joint.

A spring wall according to one of the foregoing two paragraphs can include the first thermoplastic material and the second thermoplastic material being different grades of polyurethane elastomer.

A gas spring in accordance with the subject matter of the present disclosure includes a first end member and a second end member that is disposed in spaced relation to the first end member. A spring wall is secured therebetween that at least partially defines a spring chamber. The spring wall has a longitudinal length and extends circumferentially about a longitudinally-extending axis. The spring wall is formed from at least one unreinforced elastomeric material. And, the spring wall includes a first annular zone along the longitudinal length thereof that has a first nominal stiffness value, and a second annular zone along the longitudinal length thereof that has a second nominal stiffness value. The first nominal stiffness value is at least 25 percent less than the second nominal stiffness value such that the first annular zone can provide increased fatigue life of the spring wall relative to the second annular zone and the second annular zone can provide increased hoop strength radial stiffeners of the spring wall relative to the first annular zone.

A gas spring and reservoir assembly in accordance with the present disclosure can include a reservoir and a gas spring. The reservoir can include a reservoir wall that at least partially defines a reservoir chamber having a substantially fixed volume. The gas spring can be structurally arranged in series with the reservoir such that the reservoir carries at least a portion of a load from the gas spring to an associate structural component. The gas spring including an end member and an unreinforced elastomeric spring wall that at least partially defines a spring chamber. The end member is disposed in spaced relation to the reservoir with the unreinforced elastomeric spring wall operatively disposed between the reservoir and the end member. The unreinforced elastomeric spring wall includes first and second wall portions that extends axially along a longitudinal axis and circumferentially thereabout. The first wall portion is operatively connected to the reservoir wall such that the reservoir chamber and the spring chamber are in fluid communication with one another. The first wall portion has a first nominal stiffness value and the second wall portion has a second nominal stiffness value that is different from the first nominal stiffness value of the first wall portion such that a non-constant stiffness profile is established along a longitudinal length of the spring wall.

A gas spring and reservoir assembly according to the foregoing paragraph can include the gas spring being a first gas spring and the assembly further comprising a second gas spring structurally arranged in parallel with the first gas spring and in series with the reservoir such that the reservoir carries at least a portion of the load from the first and second gas springs.

A method of manufacturing a gas spring assembly in accordance with the present disclosure includes providing a first end member and a second end member for said gas spring assembly. The method also includes forming a first portion of a spring wall from a first quantity of unreinforced elastomeric material such that the first portion of the spring wall has a first nominal stiffness value. The method further includes forming a second portion of the spring wall from a second quantity of unreinforced elastomeric material such that the second portion of the spring wall has a second nominal stiffness value that is greater than the first nominal stiffness value. This results in the spring wall having a non-constant stiffness profile established along a longitudinal length thereof. And, the method includes securing the spring wall between the first and second end members such that a spring chamber is at least partially defined therebetween.

BRIEF DESCRIPTION OF THE DRAWINGS

FIG. 6 is an enlarged cross-sectional side view of a portion of the gas spring assembly shown in FIG. 4.

FIG. 7 is an enlarged cross-sectional side view of an alternate exemplary embodiment of the gas spring assembly in FIGS. 4-6.

DEFINITIONS

Figure 1:
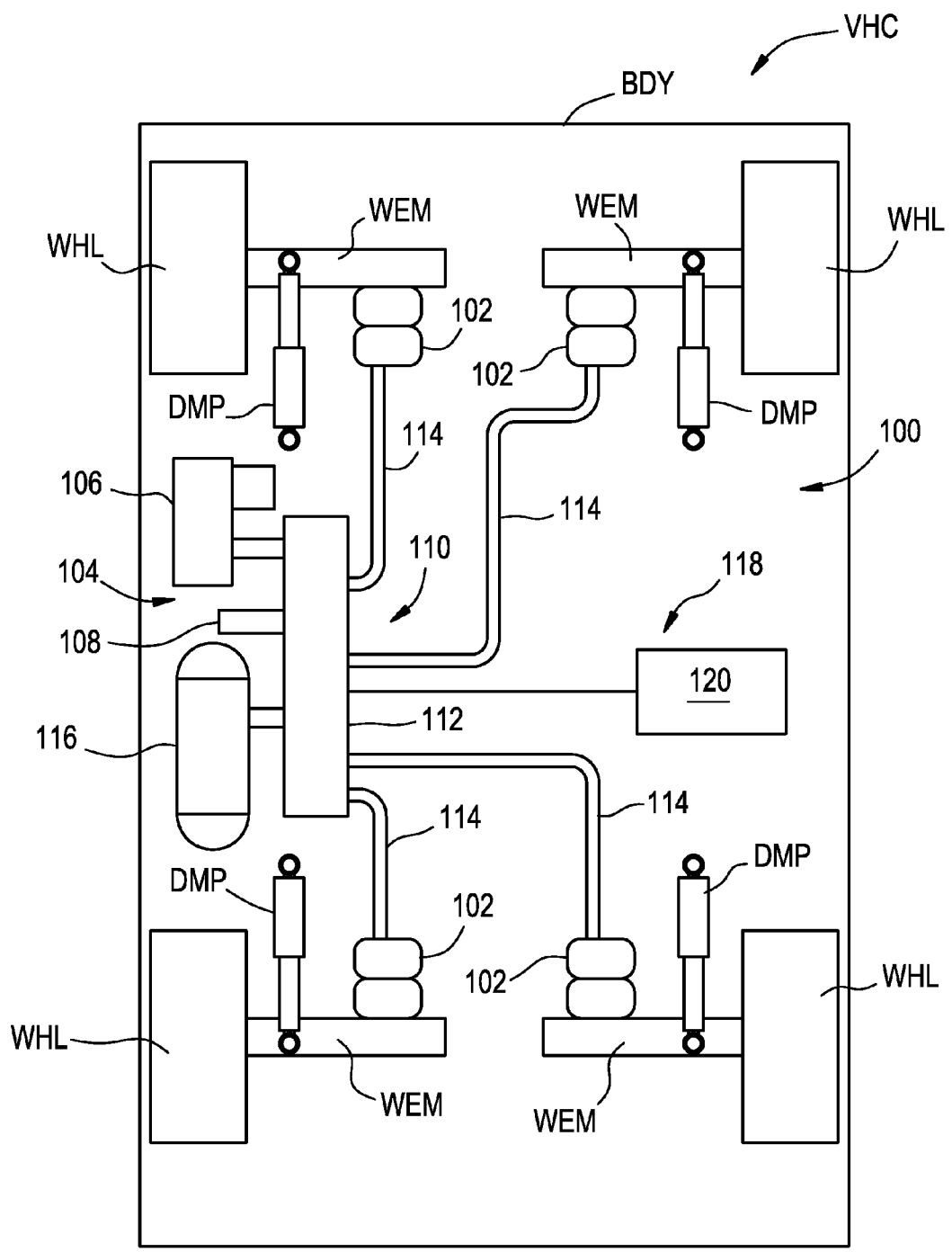
FIG. 1 is a schematic representation of one example of a vehicle suspension system that includes gas spring assemblies in accordance with the present disclosure.

The term "elastic limit," as used herein, is to be interpreted to mean the limit of distortion that a material can undergo and still return to its original form when relieved from stress.

Terms including "non-rigid," "compliant," "elastic," "elastomeric" and the like, as used herein, are to be interpreted to encompass any material that has an elongation at its elastic limit of greater than approximately 25 percent, and preferably has an elongation at its elastic limit of greater than approximately 40 percent. Exemplary "compliant" materials include natural rubber, synthetic rubber and thermoplastic elastomers, such as polyurethane, for example.

Terms including "inelastic," "low stretch," "low elongation" and the like, as used herein, are to be interpreted to encompass any material that has an elongation at its elastic limit of less than approximately 25 percent and, commonly has an elongation at its elastic limit of less than approximately 10 percent.

Terms including "reinforce," "reinforced," "reinforcing" and the like, as used herein, are to be interpreted as referring to the use of internal or external elements, structures and/or components to restrain or limit the expansion of an elastomeric spring wall being subjected to pressurized gas.

Terms such as "internal reinforcement," "internally reinforced" and the like, as used herein, are to be interpreted as referring to the use of substantially inelastic filaments (e.g., fibers, strands, yarns and threads) and/or plies of fabric, or other sections of material made therefrom that are embedded within a wall of an elongated tubular body formed from an elastomeric material to help restrict or otherwise limit the expansion thereof. Exemplary "substantially inelastic filaments" include cotton yarns, nylon cords and aramid fibers.

Terms such as "external reinforcement," "externally reinforced" and the like, as used herein, are to be interpreted as referring to the use of one or more additional structures and/or components that are assembled onto or otherwise disposed along an elastomeric spring wall, generally after the manufacture thereof, which restrict or otherwise limit the radially outward expansion of the elastomeric spring wall during use thereof.

Terms including "unreinforced," "without reinforcement" and the like, as used herein, are to be interpreted as broadly referring to an elastomeric spring wall that is capable of operation and use under conditions typically associated with known gas spring assemblies, though without the elastomeric spring wall using any substantially inelastic filaments embedded therein or any separate components externally applied thereto.

Terms including "stiff," "stiffness" and the like, as used herein, are to be interpreted as referring to a measure of resistance to elongation and/or bending of a wall or other structural feature formed from an unreinforced elastomeric material. One measure of stiffness, as referred to herein, can include axial stiffness, such as may be associated with flexural modulus, for example. Another measure of stiffness can include radial stiffness, which may also be referred to herein as hoop stiffness or hoop strength. Additionally, the term stiffness can include any combination of axial stiffness, radial stiffness and/or any other measure of stiffness. As one example, the term stiffness could refer to a measure of stiffness approximated by the following equation:

$$ST_{TOT} = \frac{A \times ST_{RAD} + B \times ST_{AX} + C \times ST_{OTH}}{100}$$

where $S_{TOT}$ is the overall stiffness of the relevant feature or wall portion, $ST_{RAD}$ is the numerical component or portion of the overall stiffness in the radial direction, $ST_{AX}$ is the numerical component or portion of the overall stiffness in the axial direction $ST_{OTH}$ can be any other measure, numerical composition or portion of the overall stiffness, A is a first variable having a value within a range of from approximately 0 to approximately 100, B is a second variable having a value within a range of from approximately 0 to approximately 100, and C is a third variable having a value within a range of from approximately 0 to approximately 100.

Additionally, stiffness can range from a minimally resistive condition having a substantially low resistance to elongation and/or bending to a more resistive condition with an increased resistance to elongation and/or bending. The minimally resistive condition being referred to herein as having a "lower stiffness" and the more resistive condition being referred to herein as having a "higher stiffness." In a preferred embodiment, a wall portion or other structural feature having a "lower stiffness" could be formed from an elastomeric material having a flexural modulus of less than approximately 15,000 psi. And, in this preferred arrangement, a wall portion or other structural feature having a "higher stiffness" could be formed from an elastomeric material having a flexural modulus of greater than 15,000 psi, and preferably greater than 30,000 psi. One example of a suitable "lower stiffness" material is a thermoplastic polyurethane available under the trade name TEXIN 285. One example of a suitable "higher stiffness material is a thermoplastic polyurethane available under the trade name TEXIN 260. Both materials are available from Bayer Material Science LLC of Pittsburgh, Pa. However, while flexural modulus is used in the preferred embodiment, it will be appreciated that any other suitable measure or quantifier of stiffness, as referred to herein, can alternately be used.

DETAILED DESCRIPTION OF THE PREFERRED EMBODIMENTS

Turning now to the drawings wherein the showings are for the purpose of illustrating exemplary embodiments of the present disclosure and not for the purpose of limiting the same, FIG. 1 illustrates a suspension system 100 that is operatively disposed between a sprung mass, such as a vehicle body BDY, for example, and an unsprung mass, such as a wheel WHL or wheel-engaging member WEM, for example, of a vehicle VHC. Suspension system 100 is shown in FIG. 1 as including a plurality of gas spring assemblies 102 operatively connected between vehicle body BDY and wheel-engaging members WEM. The suspension system can also include additional features, systems and/or components, such as a plurality of damping members DMP operatively connected between the sprung and unsprung masses of the vehicle, for example.

In accordance with the present disclosure, gas spring assemblies 102 can include at least one unreinforced elastomeric spring wall disposed between opposing end walls thereof. Preferably, the at least one unreinforced elastomeric spring wall has a stiffness property, as defined herein, that varies along at least a portion of a longitudinal length thereof, with the variation being attributable to a feature or characteristic that is something other than the inclusion and/or use of a reinforcing structure or element (e.g., inelastic filaments or a restraining cylinder). It will be appreciated that a gas spring assembly in accordance with the present disclosure can be of any suitable type, kind and/or configuration, and that the convoluted bellows-type gas springs shown in and described with regard to FIG. 1 are merely exemplary.

Suspension system 100 also includes a pressurized gas system 104 that is operatively associated with gas spring assemblies 102 for selectively supplying pressurized gas thereto and selectively transferring pressurized gas therefrom, as is well known by those of skill in the art. In the exemplary embodiment shown in FIG. 1, pressurized gas system 104 includes a pressurized gas source, such as a compressor 106, for example, that is suitable for generating pressurized gas, such as air, for example. The pressurized gas system also includes a suitable exhaust, such as a muffler 108, for example, that is suitable for venting pressurized gas from the system. A valve assembly 110 is shown as being in communication with compressor 106 and muffler 108, and can be of any suitable type, kind, configuration and/or arrangement. In the exemplary embodiment shown, valve assembly 110 includes a valve block 112 that has a plurality of valves (not shown) supported thereon with corresponding valve actuators (not shown) operatively connected to the valves and/or valve block for selectively opening and closing the valves. Gas spring assemblies can be placed in fluid communication with pressurized gas system in any suitable manner, such as by way of gas transfer lines 114, for example. Additionally, pressurized gas system 104 can also optionally include a reservoir 116, which is shown in FIG. 1 as being in fluid communication with valve assembly 110.

The exemplary embodiment of suspension system 100 in FIG. 1 can also include a control system 118 that can be in communication with one or more systems and/or components of suspension system 100 for selective operation and control thereof. For example, control system can include a controller 120 that is in communication with the valve actuators of valve assembly 110 and, optionally, in communication with compressor 106, as well. It will be appreciated that any suitable type and/or kind of communication can be used, such as direct analog communication or communication by way of a vehicle network or other communication system, for example. Regardless of the communication scheme that is used, controller 120 could be operative to selectively energize and/or de-energize the valve actuators, such as to control gas transfer to and/or from the gas spring assemblies and thereby alter or maintain a height at one or more corners of the vehicle, for example. It will be appreciated that suspension system 100, as shown and describe herein, is merely exemplary of one suitable suspension system and that any other arrangement and/or configuration could alternately be used.

As mentioned above, a gas spring assembly in accordance with the present disclosure, such as one of gas spring assemblies 102, for example, preferably includes an unreinforced elastomeric spring wall that has a stiffness characteristic or property, as defined herein, that varies along at least a portion of its longitudinal length such that the unreinforced elastomeric spring wall will have a greater stiffness along at least one section than it does along at least one other section. Such an unreinforced elastomeric spring wall construction preferably results in a non-constant stiffness profile along at least a portion the longitudinal length of the spring wall. As will be discussed in additional detail below, such a non-constant stiffness profile can also, optionally, be non-linear. Comparatively, known spring wall constructions have generally substantially constant and substantially linear stiffness profiles.

It has been recognized that different performance characteristics are attributable to different relative stiffness levels. Thus, by varying the stiffness along the longitudinal length of an unreinforced elastomeric spring wall, selective areas, sections or zones thereof can be optimized to more closely provide desirable performance characteristics. For example, higher stiffness levels of an unreinforced elastomeric spring wall will generally provide greater resistance to radially-outward expansion (i.e., provide increased hoop strength), which may help maintain the outer periphery of the spring wall within the desired operating envelope. However, higher stiffness levels can often generally correspond to a reduction in fatigue life of a spring wall. As such, in sections of the unreinforced elastomeric spring wall that are highly and/or actively flexed, it may be desirable to provide a lower stiffness level that may be beneficial to provide increased performance, reduced generation of heat and/or improved fatigue life, for example.

It is also to be understood that the variation in stiffness or stiffness profile can be adjusted in any suitable manner and by using any suitable variations and/or alterations, such as by varying the material, material properties, geometry of the unreinforced elastomeric spring wall and/or any combination thereof, for example. What's more, variation in the stiffness of an unreinforced elastomeric wall can be achieved by using different materials (i.e., different families of materials), different grades of a common material, altering the geometry (e.g., shape, wall thickness, features) of the unreinforced elastomeric spring wall or any combination of these and/or other characteristics.

Figure 2:
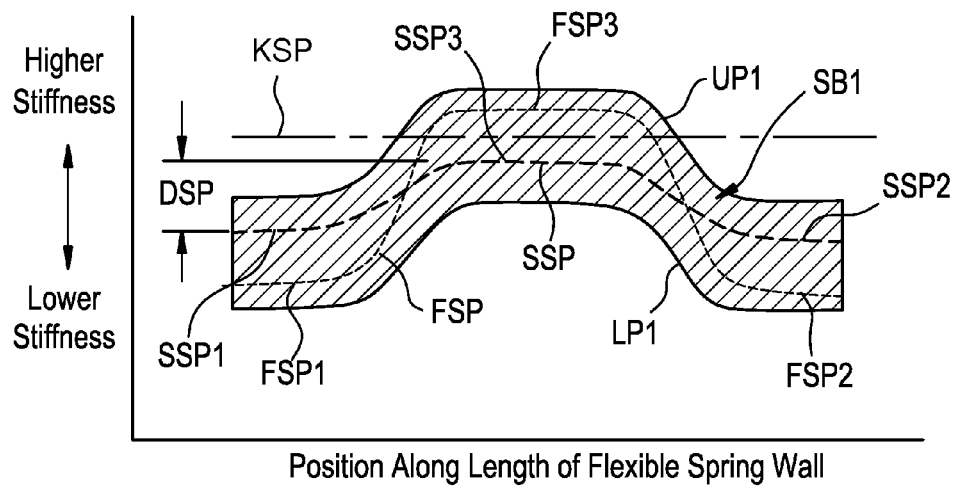
FIG. 2 a is graphical representation of exemplary stiffness profiles of unreinforced elastomeric spring walls in accordance with the present disclosure.
Figure 3:
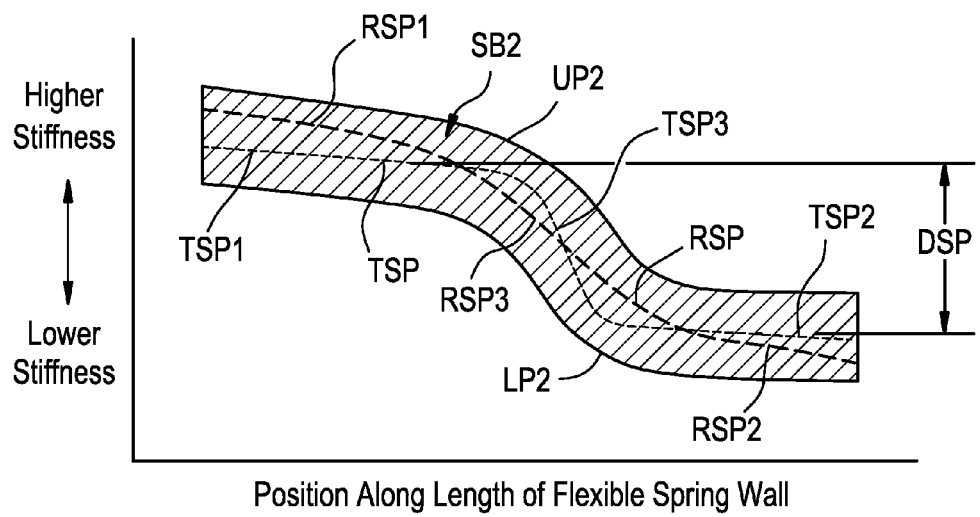
FIG. 3 is another graphical representation of exemplary stiffness profiles of unreinforced elastomeric spring walls in accordance with the present disclosure.

It will be appreciated that unreinforced elastomeric spring walls in accordance with the present disclosure can take any suitable shape, form, configuration and/or arrangement. For example, FIGS. 2 and 3 illustrate exemplary ranges for stiffness profiles, such as might be associated with a convoluted-type and/or a rolling lobe-type unreinforced elastomeric spring wall in accordance with the present disclosure. Turning, first, to FIG. 2, a stiffness band SB1 is established between an exemplary upper profile UP1 that corresponds to higher relative stiffness levels and an exemplary lower profile LP1 that corresponds to lower relative stiffness levels. An exemplary unreinforced spring wall could then take any suitable stiffness profile within these exemplary upper and lower profiles. For example, a first stiffness profile FSP is shown in FIG. 2 as having end portions or zones with a lower relative stiffness, as indicated by reference characters FSP1 and FSP2, and a central portion or zone that rather abruptly transitions into and out of a higher relative stiffness, as indicated by reference character FSP3. As another example, a second stiffness profile SSP is shown in FIG. 2 as having end portions or zones at a lower relative stiffness, as indicated by reference characters SSP1 and SSP2, and a central portion or zone that gradually and/or smoothly transitions into and out of a higher relative stiffness, as indicated by reference character SSP3.

Similarly, FIG. 3 illustrates another exemplary stiffness band SB2 that is generally established between an exemplary upper profile UP2 that corresponds to higher relative stiffness levels and an exemplary lower profile LP2 that corresponds to lower relative stiffness levels. Again, an exemplary unreinforced elastomeric spring wall can then take any suitable stiffness profile within these exemplary upper and lower boundaries. For example, a third stiffness profile TSP is shown in FIG. 3 as having a somewhat constant stiffness along a first end portion or zone TSP1 and a lower but also somewhat constant stiffness along a second end portion or zone TSP2 with a rather abrupt change in stiffness levels occurring along a central portion or zone, as indicated by reference character TSP3. As a further example, a fourth stiffness profile RSP is also shown in FIG. 3 as having a first end portion or zone that slopes from a higher relative stiffness to a lower relative stiffness, as indicated by reference character RSP1. The second or opposing end portion or zone RSP2 also has a stiffness that slopes from a higher relative stiffness level to a lower relative stiffness level. Additionally, a central wall portion or zone, which is represented by reference character RSP3, smoothly transitions between the first and second end portions.

A stiffness profile of an unreinforced elastomeric spring wall in accordance with the present disclosure includes at least one portion or zone that has a lower relative stiffness, which provides an increase in the relative flexibility of the unreinforced elastomeric spring wall. Such portions may also be referred to herein as flex areas or flex zones of the unreinforced elastomeric spring wall. Additionally, a stiffness profile of an unreinforced elastomeric spring wall in accordance with the present disclosure includes at least one portion or zone that has a higher relative stiffness, which provides additional control of outward expansion and less flexibility. Such portions may also be referred to herein as non-flex areas or non-flex zones of the unreinforced elastomeric spring wall.

As shown in FIGS. 2 and 3, there is a difference in the stiffness profiles between the one or more flex zones and the one or more non-flex zones. For illustrative purposes, the differences DSP are shown in FIGS. 2 and 3 with respective reference to stiffness profiles SSP and TSP. While it will be appreciated that FIGS. 2 and 3 are merely illustrative and are not to scale, there is preferably a substantial difference between the nominal (e.g., approximate and/or average) stiffness value of a flex zone and the nominal (e.g., approximate and/or average) stiffness value of a non-flex zone, such as a difference of greater than approximately 25 percent, for example.

Additionally, it will be appreciated that such a difference in nominal stiffness values can be attributed to any single or combination of material properties, geometric features and/or structured characteristics of the unreinforced elastomeric spring wall. For example, an unreinforced elastomeric spring wall could be formed from a single grade of polyurethane elastomer with variations in the nominal, approximate and/or average wall thickness accounting for substantially all of the difference in stiffness values. As another example, an unreinforced elastomeric spring wall could have an approximate uniform wall thickness but be formed from two or more different grades of polyurethane elastomer having flexural moduli (or another suitable property) that differ by at least approximately 25 percent and thereby result in the desired difference in stiffness values. Accordingly, an unreinforced elastomeric spring wall in accordance with the present disclosure preferably has a stiffness profile that is non-constant along at least a portion of the unreinforced elastomeric spring wall. In some cases, the stiffness profile can also be non-linear. However, it will be appreciated that a non-constant but linear stiffness profile could optionally be used. A substantially constant stiffness profile KSP representative of known spring wall constructions is shown in FIG. 2.

Figure 4:
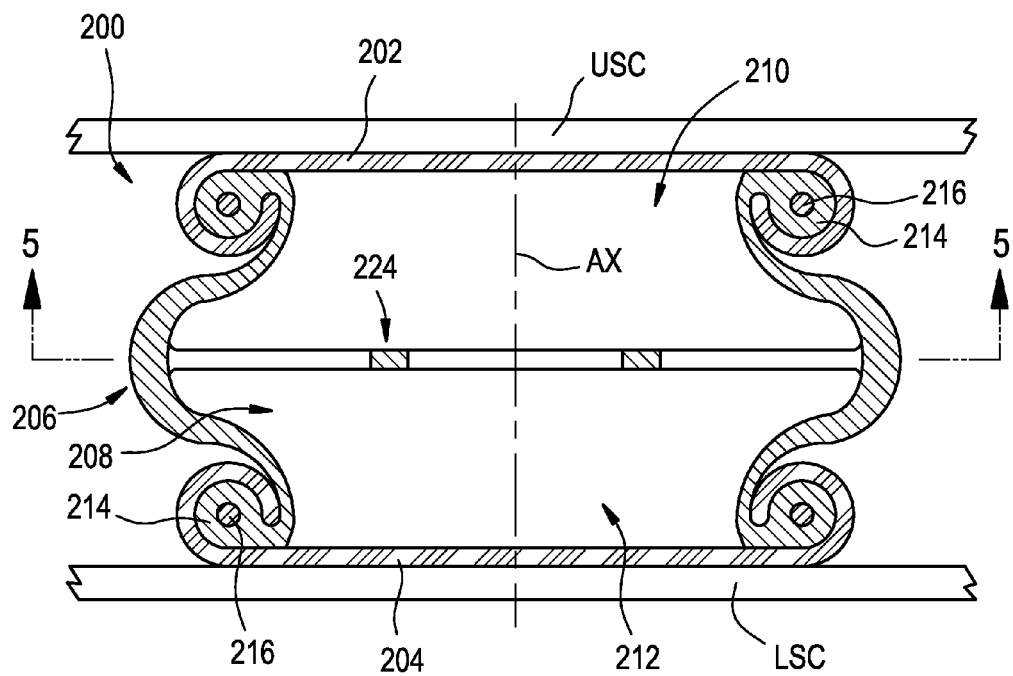
FIG. 4 is a cross-sectional side view of one exemplary embodiment a gas spring assembly having an unreinforced elastomeric spring wall in accordance with the present disclosure.
Figure 5:
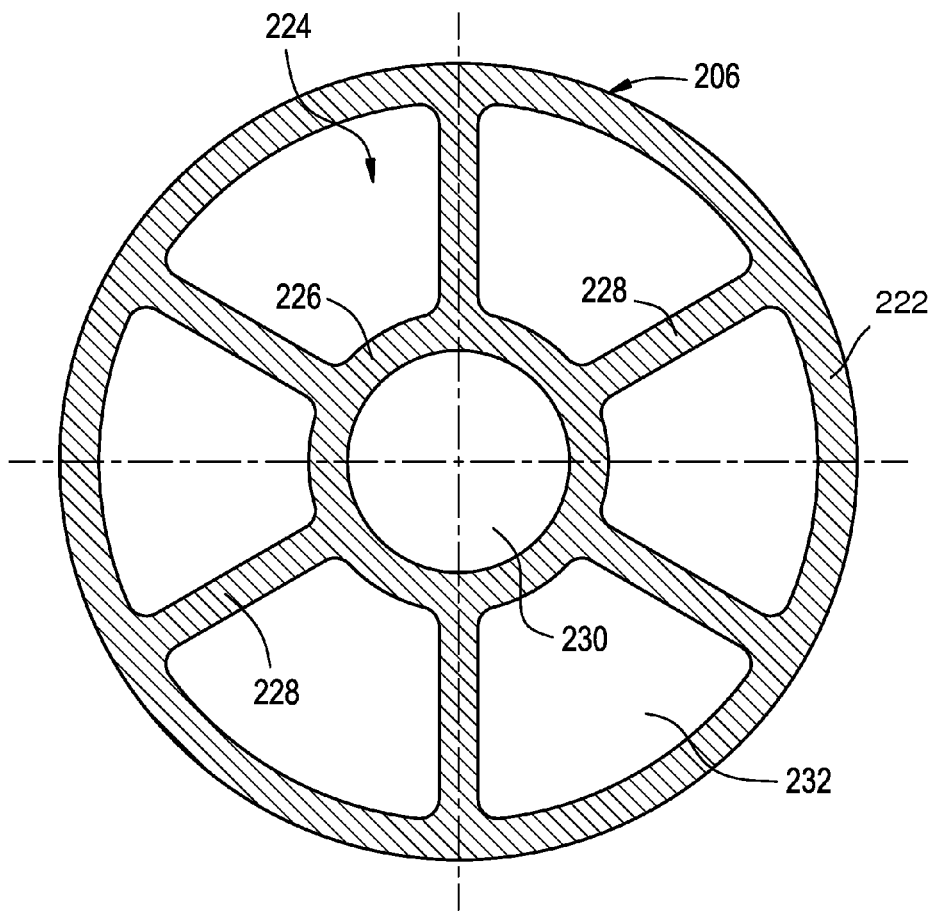
FIG. 5 is a cross-sectional view of the unreinforced elastomeric spring wall in FIG. 4 taken along line 5-5 thereof.

FIGS. 4-6 illustrate one exemplary gas spring assembly 200 that includes a first or upper end member 202 and an opposing second or lower end member 204 that is spaced from the first end member. An unreinforced elastomeric spring wall 206 is secured between the first and second end members and at least partially defines a spring chamber 208 therebetween. Gas spring assembly 200 is shown as being operatively disposed between opposing upper and lower structural components USC and LSC (e.g., body BDY and wheel-engaging member WEM of FIG. 1, respectively), and can be secured thereto in any suitable manner, as is known by those of skill in the art.

Unreinforced elastomeric spring wall 206 extends between opposing open ends 210 and 212 and circumferentially about a longitudinally-extending central axis AX. In the exemplary embodiment shown in FIGS. 4-6, mounting beads 214 are formed along each of the open ends of spring wall 206 and a bead reinforcement, such as a bead wire 216, for example, can optionally be disposed within each of the mounting beads. First and second end members 202 and 204 are respectively crimped or otherwise formed around the mounting beads provided along open ends 210 and 212 to form a substantially fluid-tight seal with unreinforced elastomeric spring wall 206. It will be appreciated, however, that any other suitable connection or arrangement capable of forming a substantially fluid-tight seal between an end member and the unreinforced elastomeric spring wall can alternately be used.

Unreinforced elastomeric spring wall 206 extends longitudinally between opposing open ends 210 and 212 and preferably has a stiffness or other flexural property that varies along at least a portion of the longitudinal length therebetween, such as has been discussed above with regard to FIGS. 2 and 3. As can be better seen in FIG. 6, a first wall portion or annular zone 218 is disposed toward open end 210 and an opposing second wall portion or annular zone 220 is disposed toward open end 212. A third wall portion or annular zone 222 is disposed between the first and second wall portions. It will be appreciated that first and second wall portions 218 and 220 smoothly transition into third wall portion 222. Additionally, the first and second wall portions are shown as respectively having first and second nominal wall thicknesses TH1 and TH2 with the third wall portion having a third nominal wall thickness TH3 that is substantially greater, such as at least 25 percent greater, for example, than the first and second wall thicknesses.

In the exemplary embodiment shown in FIGS. 4-6, unreinforced elastomeric spring wall 206 can be formed from a single, unitary material. Thus, the variations in wall thickness can generate corresponding variations in stiffness along the length of the unreinforced elastomeric spring wall. Accordingly, it would be expected that unreinforced flexible spring wall 206 would have a stiffness profile similar to second stiffness profile SSP in FIG. 2. Additionally, an inner structural element, such as inner web structure 224 in FIGS. 4 and 5, for example, can, optionally, be disposed along the unreinforced flexible spring wall in any suitable manner. In the exemplary embodiment shown in FIGS. 4 and 5, inner web structure 224 includes an inner ring 226 with radially-outwardly projecting webs 228 that are integrally formed with the unreinforced elastomeric spring wall. In the embodiment shown in FIGS. 4 and 5, inner ring 226 forms an opening 230 through the inner web structure. Additionally, webs 228 form openings 232 between the inner ring and the unreinforced elastomeric spring wall. However, it will be appreciated that any such inner structural element, if included, can take any shape, form and/or configuration. Furthermore, it will be appreciated that such an inner structural element could, alternately, be secured along the unreinforced elastomeric spring wall in another suitable manner, such as by using adhesive or by forming a welded joint therealong, for example.

Optionally, an unreinforced elastomeric spring wall in accordance with the present disclosure can include one or more additional features to further modify the stiffness profile of the unreinforced elastomeric spring wall. As one example, FIG. 7 illustrates unreinforced elastomeric spring wall 206A supported between end members 202 and 204, as discussed above. Additionally, however, unreinforced elastomeric spring wall 206A includes a plurality of stiffening ribs 234A, which may also be referred to as over-expansion rings, that extend at least partially around the circumference of the unreinforced elastomeric spring wall, such as along the interior or exterior (as shown) thereof. In the exemplary embodiment shown in FIG. 7, stiffening ribs 234A are shown as being approximately evenly spaced along third wall portion 222A as well as outwardly therefrom toward first and second wall portions 218A and 220A, respectively. The addition of stiffening ribs 234A would be expected to result in an increase of the stiffness level of the stiffness profile of unreinforced elastomeric spring wall 206A in at least the region of the stiffening ribs, as compared to the anticipated stiffness profile of unreinforced elastomeric spring wall 206, for example. In particular, the addition of stiffening ribs 234A would be expected to increase the radial stiffness of at least third wall portion 222A.

Figure 8:
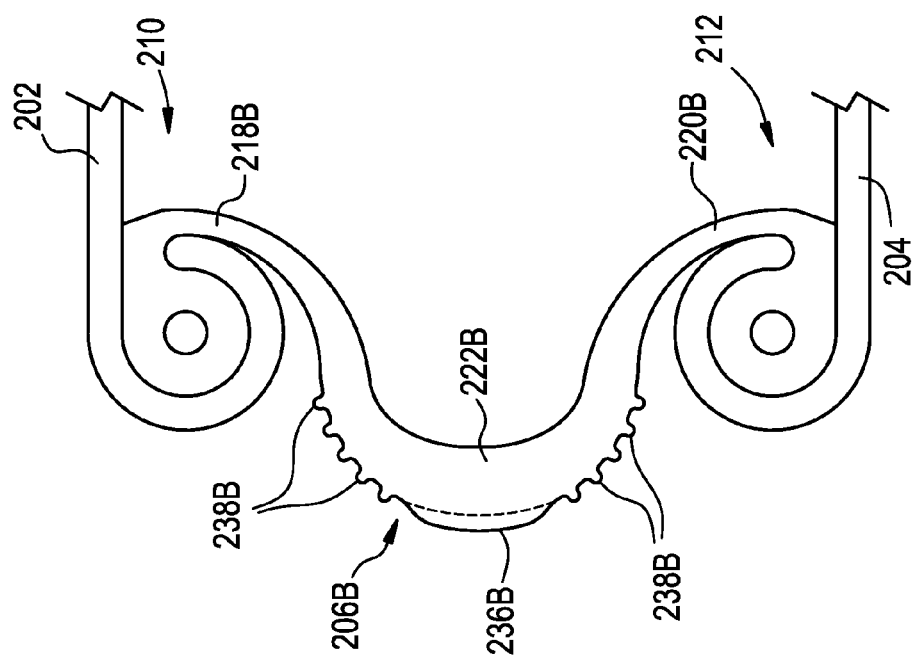
FIG. 8 is an enlarged cross-sectional side view of another alternate exemplary embodiment of the gas spring assembly in FIGS. 4-6.

As another example, FIG. 8 illustrates an unreinforced elastomeric spring wall 206B that is supported between end members 202 and 204, as discussed above. Unreinforced elastomeric spring wall 206B is shown as including a stiffening band 236B that extends at least partially about the circumference of unreinforced elastomeric spring wall 206B, such as internally or externally (as shown), for example. Stiffening band 236B is generally disposed along third wall portion 222B of the unreinforced elastomeric spring wall. Additionally, a plurality of stiffening ribs 238B extend at least partially around the unreinforced elastomeric spring wall. Stiffening ribs 238B are disposed along at least one side of stiffening band 236B and are shown in FIG. 8 with at least one stiffening rib disposed along each longitudinal end of the stiffening band toward first and second wall portions 218B and 220B, respectively. The addition of stiffening band 236B would be expected to increase the stiffness level of third wall portion 222B, as compared to the anticipated stiffness of either of third wall portions 222 or 222A. Additionally, stiffening ribs 238B would be expected to increase the stiffness level of the unreinforced elastomeric spring wall in manner similar to that described above with regard to stiffening ribs 234A. As such, it is expected that the stiffness level of the stiffness profile of at least the region of spring wall 206B that includes the stiffening band and stiffening ribs would be increased over that of either unreinforced elastomeric spring wall 206 or 206A, if formed from the same material.

Figure 9:
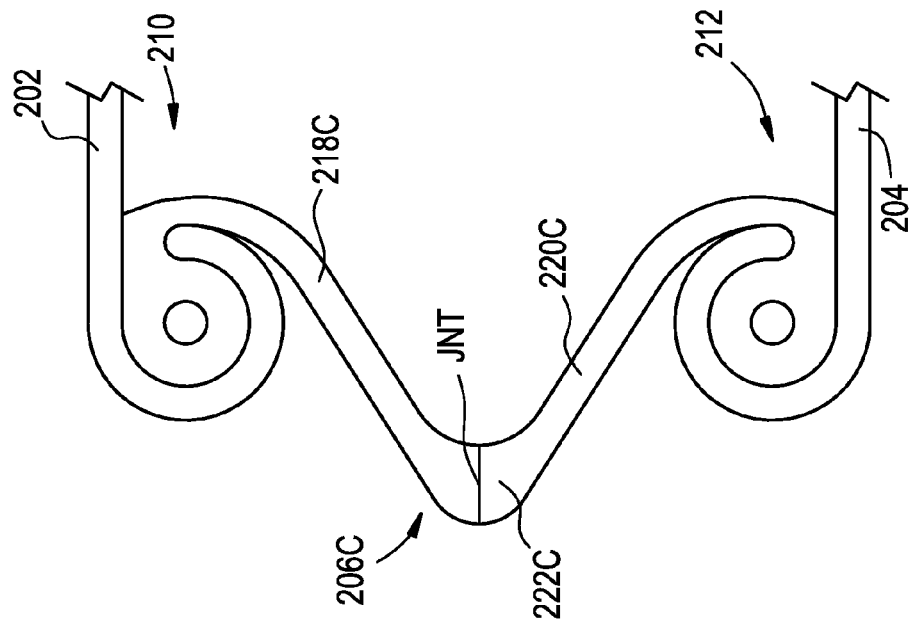
FIG. 9 is an enlarged cross-sectional side view of still another alternate exemplary embodiment of the gas spring assembly in FIGS. 4-6.

Another embodiment of an unreinforced elastomeric spring wall in accordance with the present disclosure is illustrated in FIG. 9 as unreinforced elastomeric spring wall 206C, which is shown as being secured between end members 202 and 204, as discussed above. Unreinforced elastomeric spring wall 206C includes a first wall portion 218C disposed toward first end member 202 and a second wall portion 220C disposed toward second end member 204. First and second wall portions 218C and 220C are shown as having approximately constant wall thicknesses and extend toward a third wall portion 222C, which is disposed therebetween and has a cross-section of substantially greater wall thickness in comparison to that of the first and second wall portions, such as at least 25 percent greater, for example. To facilitate manufacturing or for other reasons, unreinforced elastomeric spring wall 206C can be formed from two or more sections (e.g., one section including first wall portion 218C and another section including second wall portion 220C) that are joined or otherwise secured together in a suitable manner. For example, the two or more sections could be welded together using a suitable plastic welding process, such as an ultrasonic or spin-welding process, for example, to form a suitable welded joint, such as is represented by line JNT in FIG. 9, for example.

If formed from the same material as one or more of unreinforced elastomeric spring walls 206, 206A and/or 206B, it is expected that the stiffness profile of unreinforced elastomeric spring wall 206C would be lower relative to walls 206, 206A and/or 206B. This would be expected to be due, at least in part, to the extended length of first and second wall portions 218C and 220C at the approximately constant thickness thereof as well as the corresponding distance at which these wall portions transition to the increased thickness of third wall portion 222C. However, first and second wall portions 218C and 220C could, alternately, be formed from different materials (e.g., two different grades of a common material or materials from two different families of material).

Figure 10:
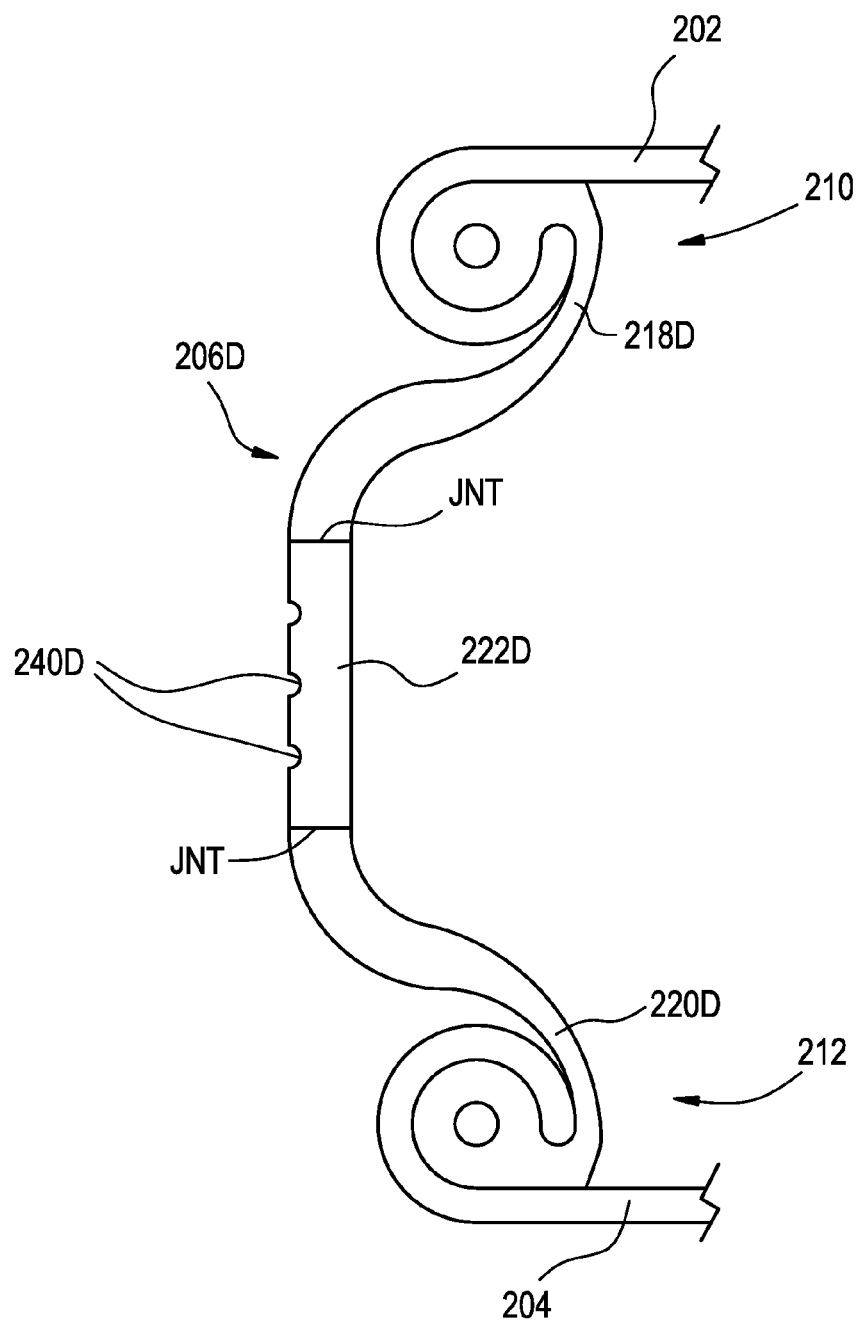
FIG. 10 is an enlarged cross-sectional side view of a further alternate exemplary embodiment of the gas spring assembly in FIGS. 4-6.

Still another exemplary embodiment of an unreinforced elastomeric spring wall in accordance with the present disclosure is illustrated in FIG. 10 as unreinforced elastomeric spring wall 206D, which is shown as being secured between end members 202 and 204, as has been previously discussed. Unreinforced elastomeric spring wall 206D is shown as including first and second wall portions 218D and 220D, which are respectively disposed toward end members 202 and 204. A substantially cylindrically shaped third wall portion 222D extends between the first and second wall portions. As with any of the previously described or other embodiments of an unreinforced elastomeric spring wall in accordance with the present disclosure, different ones of the wall portions thereof can be formed from different materials or grades of the same material to achieve the desired stiffness profile. In the embodiment shown in FIG. 10, any suitable joints or other connection arrangements can be used to secure the wall portions to one another, such as are represented by lines JNT in FIG. 10, for example. Additionally, one or more radially-inwardly extending annular grooves 240D, which may also be referred to herein as flex relief grooves, can be optionally formed into one or more of the wall portions, such as into third wall portion 222D as shown in FIG. 10, for example, to thereby alter the stiffness profile of the unreinforced elastomeric spring wall.

While it will be appreciated that the foregoing embodiments are shown and described as having differing geometries and structural features, an unreinforced elastomeric spring wall in accordance with the present disclosure can additionally, or alternately, provide variations in the stiffness profile thereof by utilizing different materials or different grades of the same material to form the unreinforced elastomeric spring wall. Thus, one or more of the first, second and/or third wall portions of any one of the exemplary or any other unreinforced elastomeric spring walls can be formed from a first material with a different one or more of the first, second and/or third wall portions being formed from a second, different material or a different grade of the first material.

Figure 11:
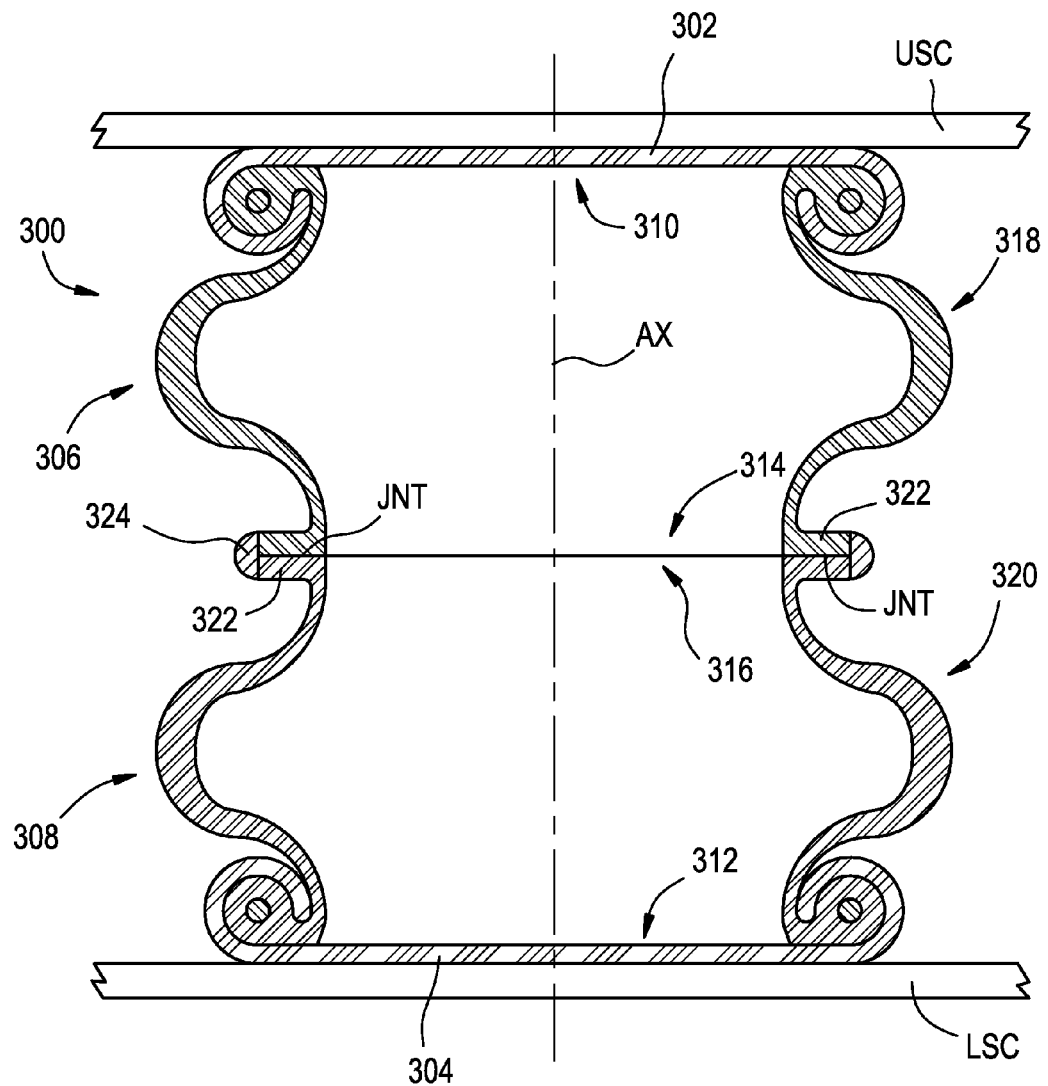
FIG. 11 is a cross-sectional side view of another exemplary embodiment of gas spring assembly having an unreinforced elastomeric spring wall in accordance with the present disclosure.
Figure 12:
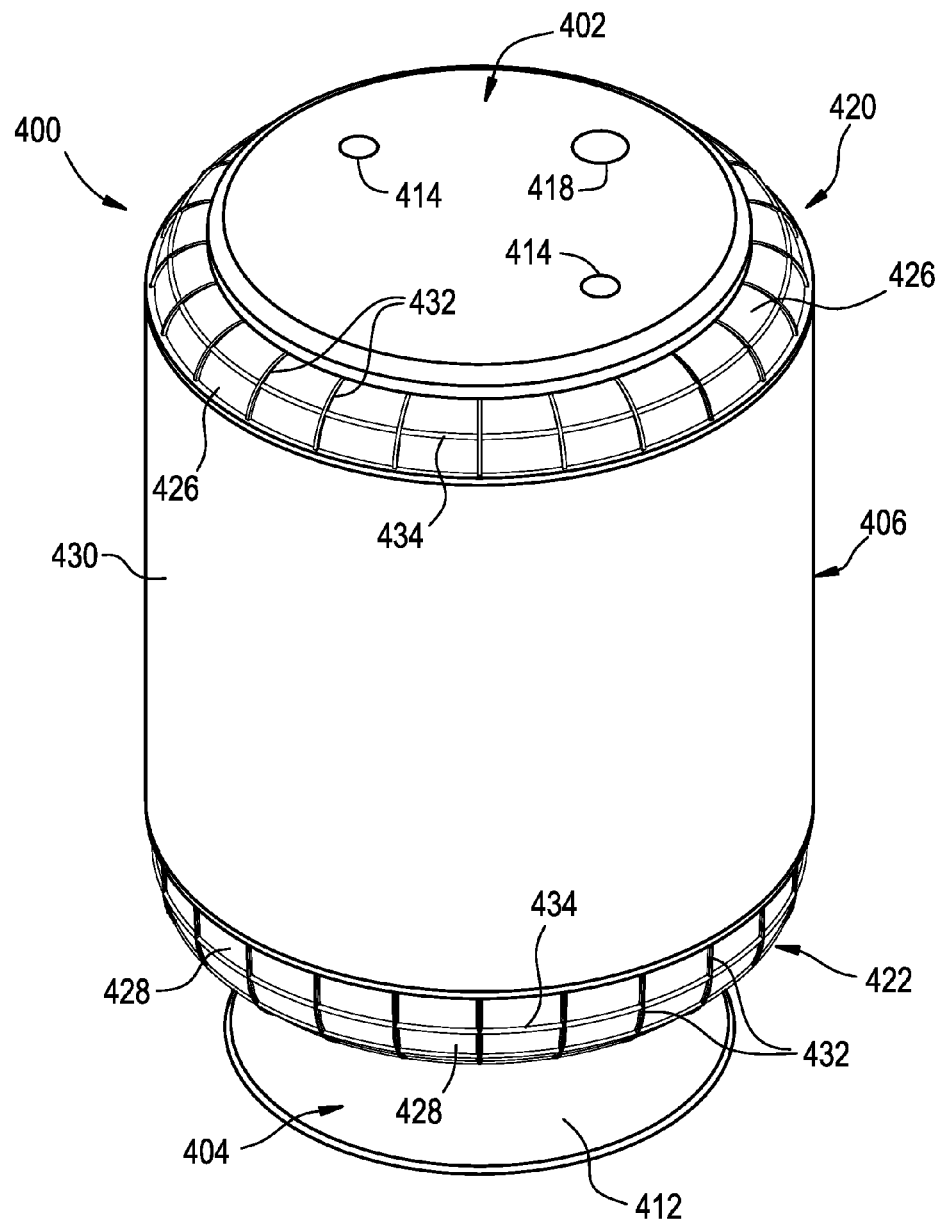
FIG. 12 is a top perspective view of still another exemplary embodiment of a gas spring assembly having an unreinforced elastomeric spring wall in accordance with the present disclosure.
Figure 13:
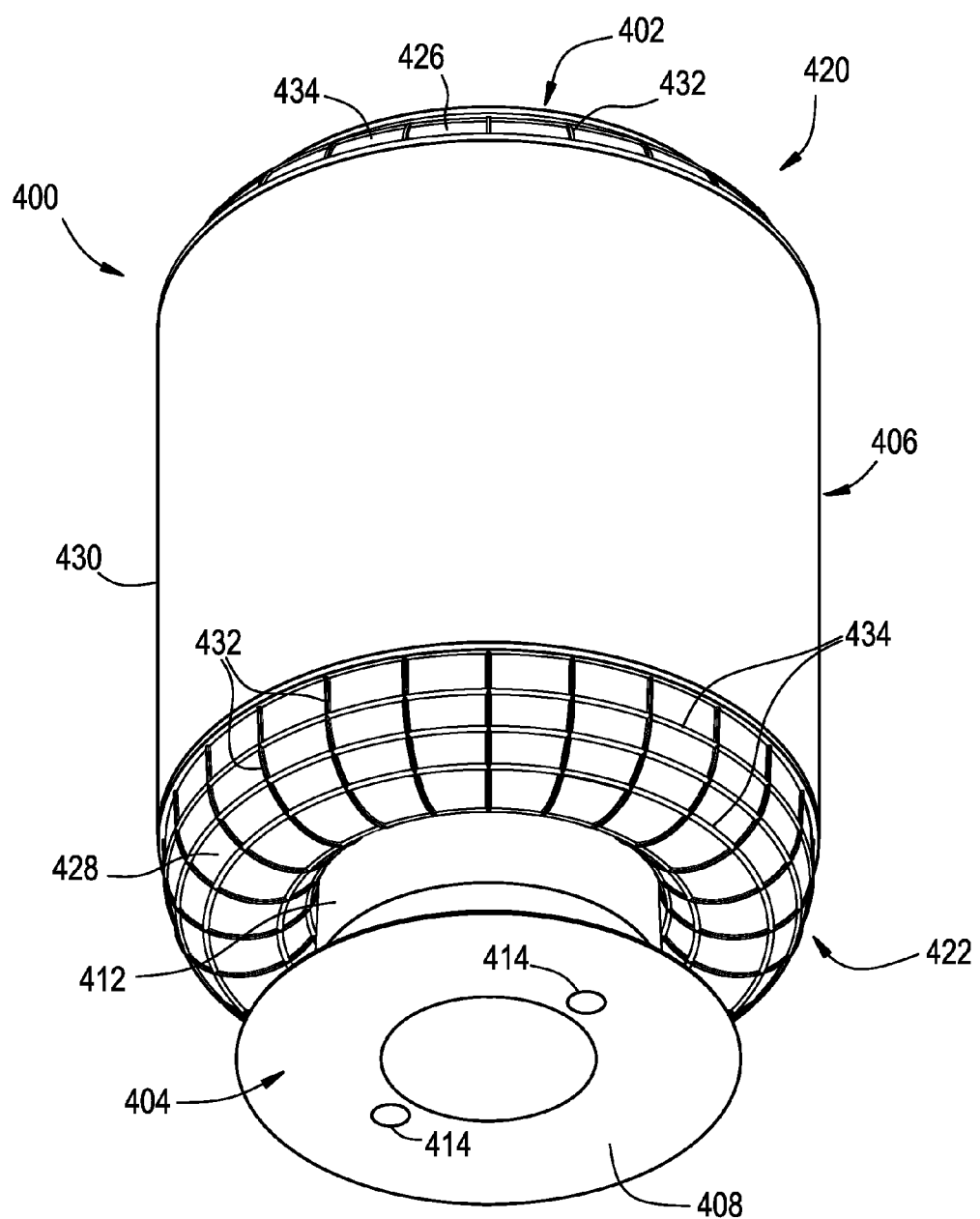
FIG. 13 is a bottom perspective view of the exemplary gas spring assembly in FIG. 12.
Figure 14:
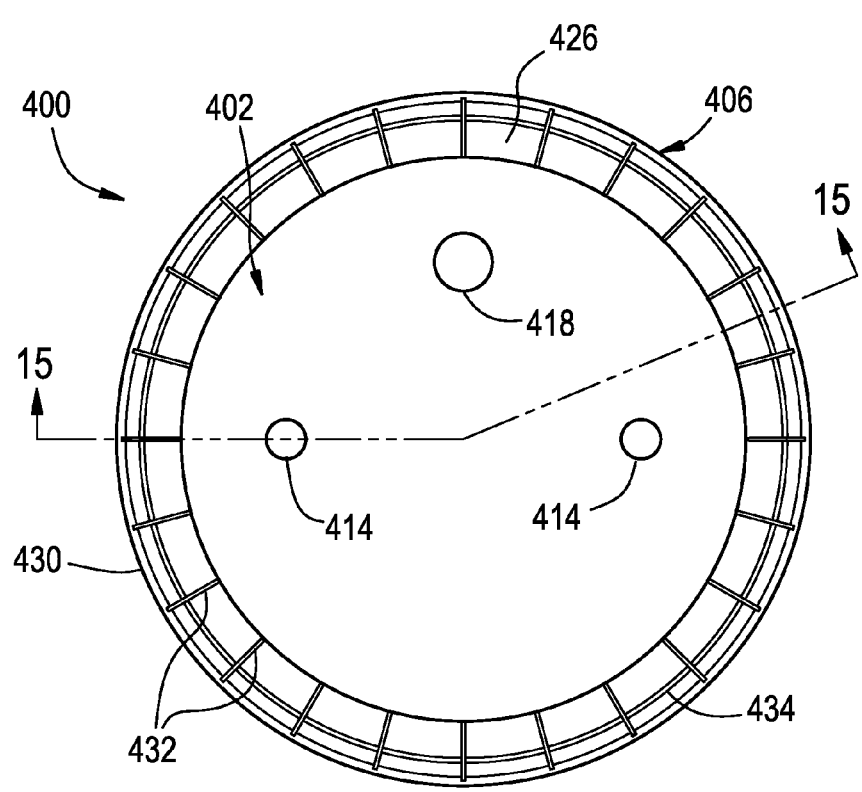
FIG. 14 is a top plan view of the exemplary gas spring assembly in FIGS. 12 and 13.

Another exemplary embodiment of a gas spring assembly 300 in accordance with the present disclosure is illustrated in FIG. 11 and is shown disposed between opposing upper and lower structural components USC and LSC (e.g., body BDY and wheel-engaging member WEM of FIG. 1, respectively). Gas spring assembly 300 includes opposing end members 302 and 304 that can be respectively secured along upper and lower structural components USC and LSC in any suitable manner. Additionally, gas spring assembly 300 includes a first spring portion 306 and a second spring portion 308 that are shown as having opposing open ends 310 and 312 that are respectively secured along end members 302 and 304 in a suitable manner, such as by using a crimped connection, for example. Additionally, first and second spring portions 306 and 308 are secured to one another along inner open ends 314 and 316 respectively thereof. The first and second spring portions form a gas spring assembly having two bellows or convolutions. However, it will be appreciated that additional spring portions can optionally be included to form additional bellows or convolutions.

At least one of the spring portions of gas spring assembly 300 preferably includes an unreinforced elastomeric spring wall. In the embodiment shown in FIG. 11, each of first and second spring portions 306 and 308 respectively include an unreinforced elastomeric spring wall 318 and 320. It will be recognized that unreinforced elastomeric spring walls 318 and 320 are shown as being substantially similar to unreinforced elastomeric spring wall 206 shown in FIGS. 4-6. However, it will be appreciated that any other suitable shape, configuration and/or construction of an unreinforced elastomeric spring wall could alternately be used, such as one or more of walls 206A-D, for example. Additionally, first and second spring portions 306 and 308 can optionally be formed from one or more materials or grades of materials and can optionally be of different materials and/or constructions from one another, as well.

First and second spring portions can be secured to one another in any suitable manner and by using any suitable combination of structural features. For example, each of first and second spring portions 306 and 308 can include a flange 322 extending radially-inwardly or radially-outwardly along unreinforced elastomeric spring walls 318 and 320. Such flanges can then be secured together in any suitable manner, such as by using an adhesive or a welded joint JNT, for example, to form a substantially fluid-tight connection or seal therebetween. Optionally, a girdle hoop 324 or other suitable structural element can be disposed along and/or secured to one or more of the unreinforced elastomeric spring walls, such as along end portions of flanges 322 thereof, for example. Additionally, it will be appreciated that girdle hoop 324 can be formed from the same material as one or more of the portions of the unreinforced flexible spring walls or from a different material or grade of material than such other components.

In one exemplary construction, the opposing end members and girdle hoop can be formed from a substantially rigid polymeric material. The first and second spring portions can be formed from a more compliant material that is compatible with the substantially rigid material such that suitable weld joints can be formed therebetween to assemble the gas spring. The stiffness profile of the unreinforced elastomeric spring walls could then be established as a function of wall geometry and configuration.

Still another exemplary embodiment of a gas spring assembly 400 in accordance with the present disclosure is shown in FIGS. 12-15 and includes a first end member 402 and an opposing second end member 404 that is spaced from the first end member. An unreinforced elastomeric spring wall 406 can be secured between the first and second end members in any suitable manner. In the exemplary embodiment shown, gas spring assembly 400 is of a rolling lobe-type construction. As such, second end member 404 is commonly referred to as a piston and includes a bottom wall or surface 408, a top wall or surface 410 that is disposed opposite the bottom wall, and a side wall or surface 412 that extends between the top and bottom walls. Unreinforced elastomeric spring wall 406 is preferably secured on second end member 404 such that at least a portion of the unreinforced elastomeric spring wall rolls along side wall 412, as is well understood in the art.

The first and second end members can include any suitable mounting features for securing the gas spring assembly between opposing structural components, such as body BDY and wheel-engaging member WEM of FIG. 1, for example. In the exemplary embodiment shown, threaded holes 414 are included within each of the first and second end members and can receive suitable threaded fasteners (not shown). Additionally, unreinforced elastomeric spring wall 406 is secured between opposing end members 402 and 404, and thereby forms a spring chamber 416 (FIG. 15) therebetween. A passage 418 can be formed through first end member 402 for permitting fluid communication with spring chamber 416.

As can be seen in FIGS. 12-15, unreinforced elastomeric spring wall 406 includes opposing first and second ends 420 and 422. In the exemplary embodiment shown, first end 420 is an open end that is secured on first end member 402. Second end 422 is shown as being a closed end that is supported on top surface 410 of second end member 404. Additionally, second or closed end 422 includes an optional mounting post 424 that projects from the closed end and is received on second end member 404 for securement of the unreinforced elastomeric spring wall thereto. It will be appreciated, however, that any other suitable mounting and/or securement arrangements could alternately be used.

In accordance with the present disclosure, unreinforced elastomeric spring wall 406 preferably has a stiffness profile that varies along at least a portion of the longitudinal length thereof, such as between first and second ends 420 and 422, for example. It will be appreciated that the variation in the stiffness profile of the unreinforced elastomeric spring wall can be achieved in any suitable manner, such as by utilizing changes in the structure of the wall (e.g., using different wall thicknesses and/or geometric features) and/or by using different materials or different grades of the same material, as has been discussed above in greater detail.

Figure 15:
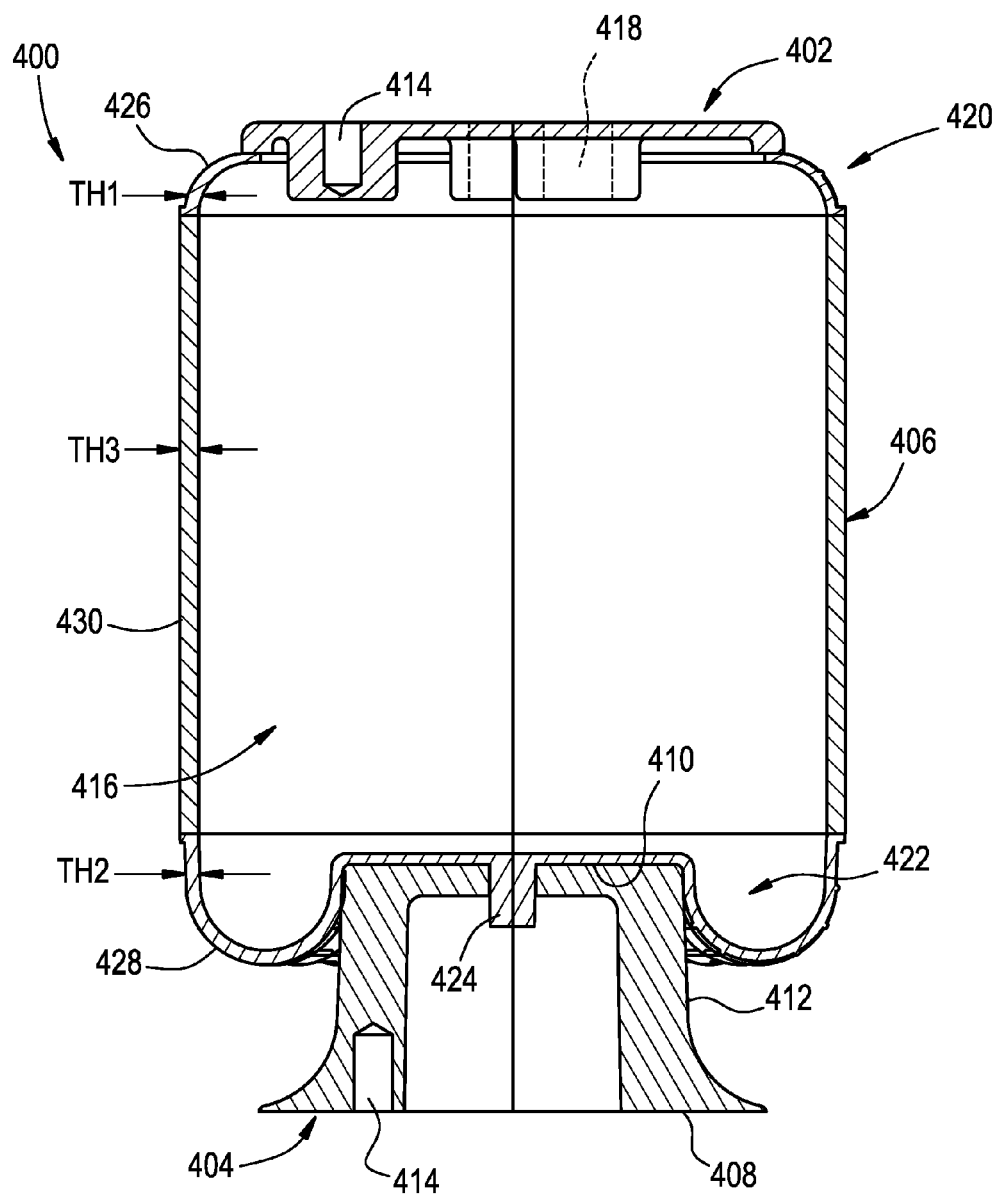
FIG. 15 is a cross-sectional side view of the exemplary gas spring assembly in FIGS. 12-14 taken along line 15-15 in FIG. 14.

In the exemplary embodiment shown in FIGS. 12-15, unreinforced elastomeric spring wall 406 includes a first wall portion 426 disposed toward first end 420, a second wall portion 428 disposed toward second end 422, and a third wall portion 430 disposed between the first and second wall portions. With reference to FIG. 15, first wall portion 426 is shown as having a first thickness TH1 and second wall portion 428 is shown as having a second thickness TH2. Additionally, third wall portion 430 is shown in FIG. 15 as having a third thickness TH3. In one exemplary embodiment, first and second thicknesses TH1 and TH2 can be approximately equal to one another with third thickness TH3 being substantially greater than the first and second thicknesses such that the first and second wall portions form exemplary flex zones and the third wall portion form an exemplary non-flex zone. These variations in wall thickness of the unreinforced flexible spring wall would be expected to result in a stiffness profile that varies along the longitudinal length thereof. As one example, such variations might result in a stiffness profile that would fit within the stiffness band SB1 shown in FIG. 2. It will be appreciated, however, that first wall portion 426 is optional and that third wall portion 430 could be directly secured along the first end member. In such case, the resulting stiffness profile might fit within stiffness band SB2 shown in FIG. 3. Further variations in the stiffness profile can be achieved by using different materials or grades of the same material for the different wall portions, as discussed above with regard to other embodiments. Also, additional structural features can optionally be included to alter one or more sections of the stiffness profile of the unreinforced flexible spring wall, such as by including longitudinally-extending and/or circumferentially-extending ribs 432 and/or 434, for example.

Figure 16:
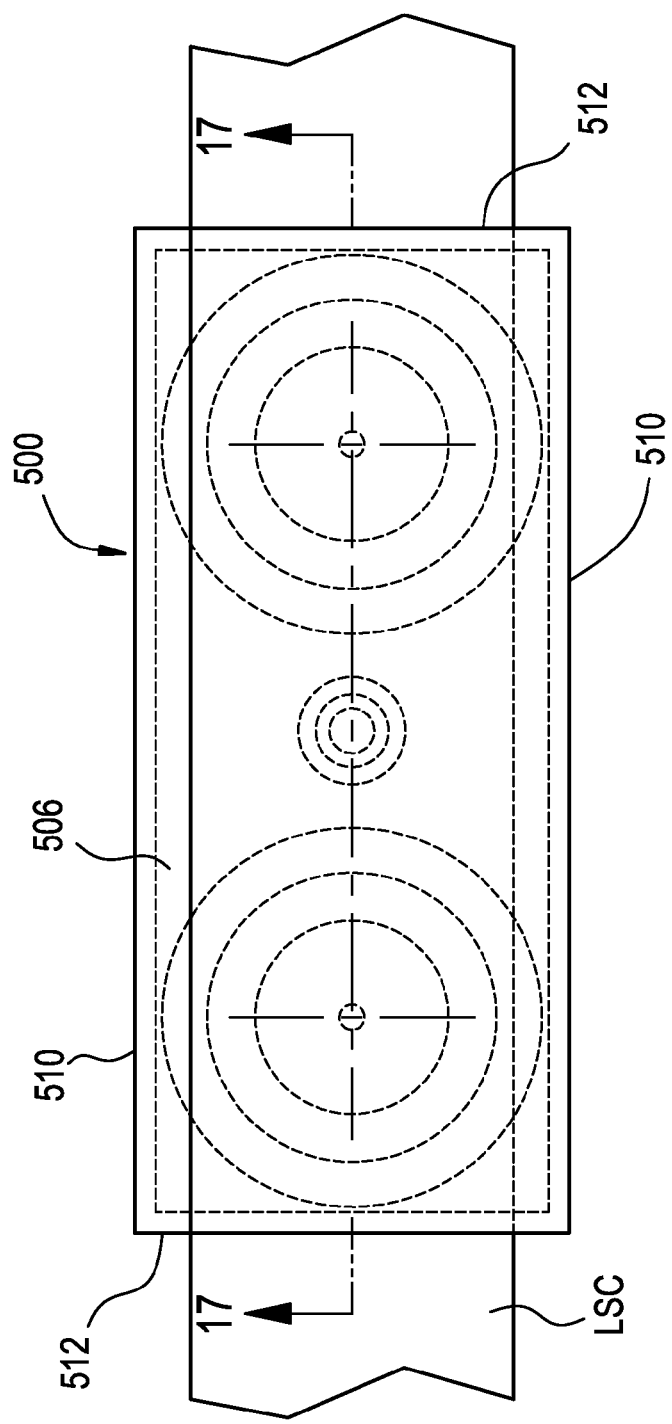
FIG. 16 is a top plan view of one example of a gas spring and reservoir assembly in accordance with the present disclosure.
Figure 17:
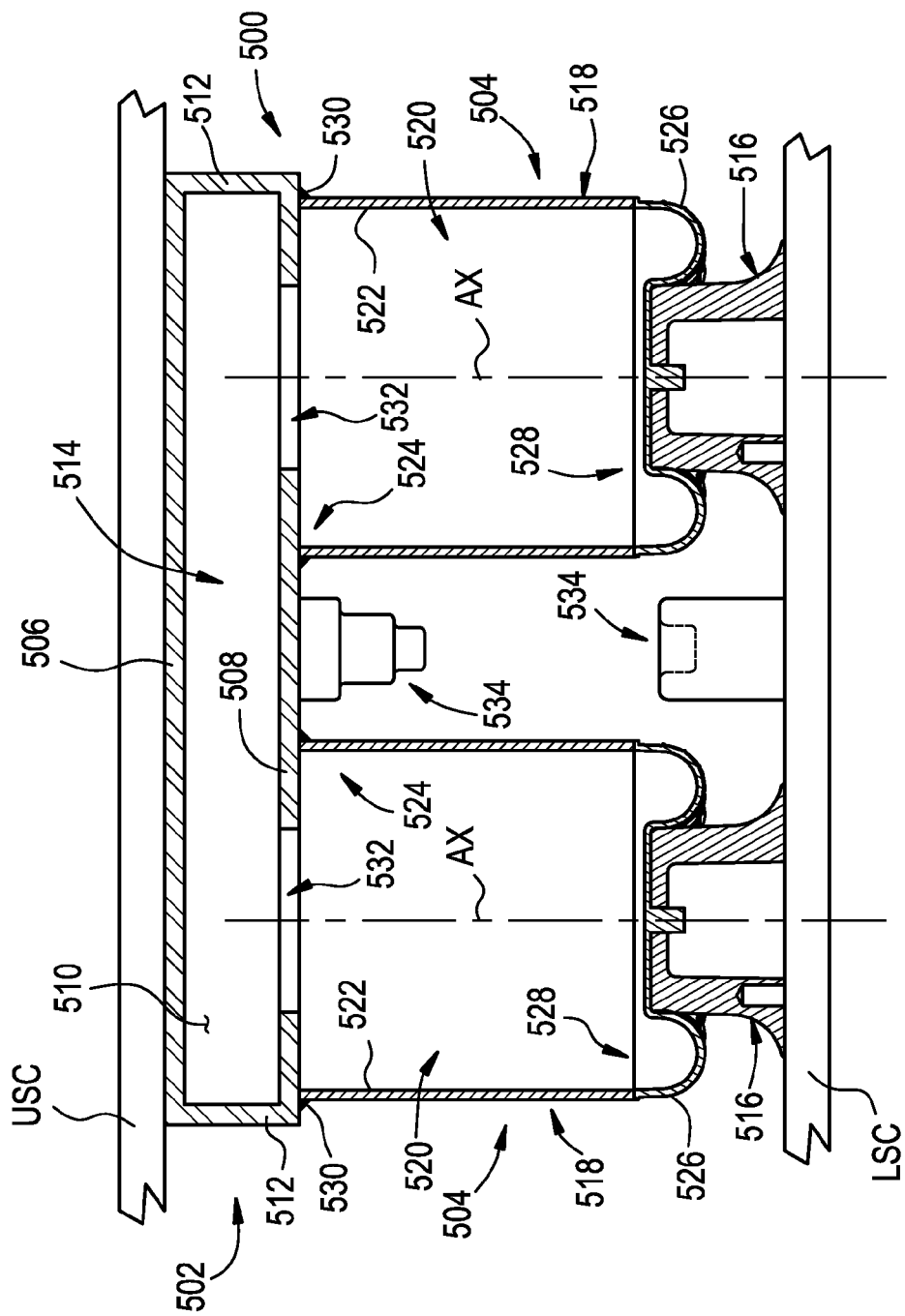
FIG. 17 is a cross-sectional side view of the gas spring and reservoir assembly taken along line 17-17 in FIG. 16.

One example of a gas spring and reservoir assembly 500 in accordance with the present disclosure is shown in FIGS. 16 and 17 as being operatively disposed between opposing upper and lower structural components USC and LSC (e.g., a cab body and supporting frame or chassis of a vehicle), and can be secured thereto in any suitable manner. Assembly 500 includes a reservoir 502 and at least one gas spring 504 that is operatively connected in series with the reservoir such that load inputs can be carried or otherwise transmitted to, from and between the upper and lower structural components by assembly 500. In the exemplary arrangement shown in FIGS. 16 and 17, two gas springs are used and are disposed in approximate alignment (e.g., approximately parallel relation) with one another for use in parallel operation with one another and in serial operation with the reservoir.

Reservoir 502 can be of any suitable size, shape, construction and/or configuration that is suitable for both providing a gas volume in fluid communication with the one or more gas springs and for carrying forces to and/or from the gas spring or springs to an associated structural component, such as upper structural component USC, for example. In the exemplary arrangement shown in FIGS. 16 and 17, reservoir 502 includes a top wall 506, a bottom wall 508, opposing side walls 510 and opposing end walls 512 that together at least partially define a reservoir chamber 514. Additionally, reservoir 502 can optionally include one or more support walls (not shown), support posts (not shown) and/or other structural support features (not shown) that may assist in providing structural integrity and/or load-carrying capabilities to the reservoir (e.g., extending between top and bottom walls 506 and 508).

The one or more gas springs of assembly 500 can be of any suitable type, kind and/or construction that include an unreinforced elastomeric spring wall in accordance with the present disclosure. For example, the gas spring or springs can take the form of gas springs 102, 200, 300, 400 or any combination thereof with an unreinforced elastomeric spring wall such as unreinforced elastomeric spring wall 206, 206A, 206B, 206C, 206D, 306, 308, 406 or any combination thereof. In the exemplary arrangement shown in FIGS. 16 and 17, gas springs 504 are shown as being substantially similar to gas springs 400 shown in and described with reference to FIGS. 12-15. More specifically, gas springs 504 include and end member 516, such as a piston, for example, and an unreinforced elastomeric spring wall 518 that is operatively connected to end member 516. It will be appreciated that end member 516 is shown as being substantially identical to second end member 404 of gas spring 400. As such, a detailed description of end member 516 is not repeated here.

Unreinforced elastomeric spring wall 518 extends circumferentially about a longitudinal axis AX and at least partially defines a spring chamber 520 of gas spring 504. It will be appreciated that unreinforced elastomeric spring wall 518 is substantially similar to unreinforced elastomeric spring wall 406 of gas spring 400, and includes a first wall portion 522 disposed toward a first end 524 and a second wall portion 526 disposed toward a second end 528. It will be recognized that first wall portion 522 generally corresponds to third wall portion 430 of gas spring 400 and that second wall portion 526 generally corresponds to second wall portion 428 of gas spring 400. As such, a detailed description of unreinforced elastomeric spring wall 518 is not repeated here.

However, unreinforced elastomeric spring wall 518 differs from unreinforced elastomeric spring wall 406 in that unreinforced elastomeric spring wall 518 does not include first wall portion 426 that was optionally included along unreinforced elastomeric spring wall 406. Rather, open end 524 of gas springs 504 is disposed along bottom wall 508 of reservoir 502 with first wall portion 522 being secured to the bottom wall in a manner suitable for forming a substantially fluid-tight seal with the bottom wall, such as by way of a flowed-material joint 530 (e.g., a weld joint or an adhesive joint).

In a preferred arrangement, reservoir 502 is constructed such that reservoir chamber 514 is substantially fluid-tight and is also of a substantially fixed volume. Reservoir chamber 514 can be placed in fluid communication with the spring chamber of the one or more gas springs in any suitable manner. In a preferred arrangement, bottom wall 508 includes at least one opening that places the reservoir chamber in fluid communication with the spring chamber of the one or more gas springs. In the exemplary arrangement shown in FIGS. 16 and 17, bottom wall 508 includes openings 532 that place reservoir chamber 514 in fluid communication with spring chambers 520 of gas springs 504.

Additionally, in a preferred arrangement, openings 532 may be of sufficient size to permit the spring chamber(s) of the gas spring(s) and the reservoir chamber to operate in a manner similar to or otherwise approximating a single gas volume. In such case, assembly 500 may be provide improved load-carrying and/or other performance capabilities while maintaining a relatively low spring rate, which can provide improved ride comfort and/or other desirable characteristics. Additionally, assembly 500 can optionally include one or more bumper elements 534 that assist in preventing contact between components. While two, opposing bumper elements are shown in FIGS. 16 and 17, it will be appreciated that a single bumper element could alternately be used.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation.

Furthermore, the phrase "flowed-material joint" and the like are to be interpreted to include any joint or connection in which a liquid or otherwise flowable material (e.g., a melted thermoplastic or combination of melted thermoplastic) is deposited or otherwise presented between adjacent component parts and operative to form a fixed and substantially fluid-tight connection therebetween. Examples of processes that can be used to form such a flowed-material joint include, without limitation, welding and/or adhesive processes. In such cases, one or more thermoplastic materials can be used to form such a flowed-material joint, in addition to any material from the component parts themselves (e.g., ultrasonic and spin welding processes). Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment is specifically shown and described as including all such features and components. However, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations insofar as they come within the scope of the appended claims and any equivalents thereof.

What is claimed is:

1. A gas spring assembly displaceable between extended and compressed conditions, said gas spring assembly comprising:
   a first end member;
   a second end member disposed in spaced relation to said first end member; and,
   a spring wall secured therebetween that at least partially defines a spring chamber, said spring wall having a longitudinal length and extending circumferentially about a longitudinally-extending axis, said spring wall formed from an unreinforced thermoplastic elastomer material, and said spring wall including a first annular zone along said longitudinal length that has a first nominal stiffness value and a second annular zone along said longitudinal length that has a second nominal stiffness value, said first nominal stiffness value being at least 25 percent less than said second nominal stiffness value such that said first annular zone operates as a flex zone of said spring wall varying from a first cross-sectional shape to a second cross-sectional shape that is substantially different from said first cross-sectional shape during displacement of said gas spring assembly between extended and compressed conditions, and said second annular zone operates as a non-flex zone of said spring wall forming a substantially-rigid wall portion of said spring wall relative to said first annular zone having an approximately consistent cross-sectional shape during displacement between extended and compressed conditions of said gas spring assembly.

2. A gas spring assembly according to claim 1, wherein said first annular zone is formed from a first unreinforced thermoplastic elastomer material having a first flexural modulus and said second annular zone is formed from a second unreinforced thermoplastic elastomer material that is different from said first unreinforced thermoplastic elastomer material and has a second flexural modulus that is at least 25 percent greater than said first flexural modulus such that said difference between said first and second nominal stiffness values is at least partially related to said difference in said first and second flexural moduli.

3. A gas spring assembly according to claim 1, wherein said first annular zone of said spring wall has a first nominal wall thickness and said second annular zone of said spring wall has a second nominal wall thickness that is at least 25 percent greater than said first nominal wall thickness such that said difference between said first and second nominal stiffness values is at least partially related to said difference in said first and second nominal wall thicknesses.

4. A gas spring assembly according to claim 1, wherein said first annular zone of said spring wall has a first nominal wall thickness and said second annular zone of said spring wall has a second nominal wall thickness;
said first annular zone is formed from a first unreinforced thermoplastic elastomer material having a first flexural modulus and said second annular zone is formed from a second unreinforced thermoplastic elastomer material having a second flexural modulus; and,
a combination of said difference between said first and second nominal wall thicknesses and said difference between said first and second flexural moduli resulting in said second nominal stiffness value of said second annular zone being at least 25 percent greater than said first nominal stiffness value of said first annular zone.

5. A gas spring assembly according to claim 1, wherein said spring wall includes a third annular zone along said longitudinal length thereof, said third annular zone having a third nominal stiffness value that different from at least one of said first nominal stiffness value of said first annular zone and said second nominal stiffness value of said second annular zone.

6. A gas spring assembly according to claim 1, wherein said first and second end members and said second annular zone of said spring wall are formed from a first unreinforced thermoplastic elastomer, and at least said first annular zone is formed from a second unreinforced thermoplastic elastomer that is different from said first unreinforced thermoplastic elastomer.

7. A gas spring assembly according to claim 6, wherein said first unreinforced thermoplastic elastomer has a flexural modulus of greater than 20,000 psi, and said second unreinforced thermoplastic elastomer has a flexural modulus of less than 15,000 psi.

8. A gas spring assembly according to claim 5, wherein said first annular zone has a first nominal wall thickness, said second annular zone has a second nominal wall thickness that is different from said first nominal wall thickness, and said third annular zone has a third nominal wall thickness that is different from at least one of said first nominal wall thickness and said second nominal wall thickness.

9. A gas spring assembly according to claim 5, wherein said unreinforced thermoplastic elastomer material of said second annular zone is different than said unreinforced thermoplastic elastomer material of said first annular zone, and said unreinforced thermoplastic elastomer material of said third annular zone is different than said unreinforced thermoplastic elastomer material of at least one of said unreinforced thermoplastic elastomer material of said first annular zone and said unreinforced thermoplastic elastomer material of said second annular zone.

10. A gas spring assembly according to claim 1, wherein said flex zone has a lower stiffness resulting in an increased flexibility of said flex zone relative to said non-flex zone, and said non-flex zone has a substantially greater stiffness relative to said flex zone resulting in control of outward expansion and less flexibility of said spring wall.

11. A gas spring assembly according to claim 1, wherein one of said first and second end members includes an outside surface with at least a portion of said spring wall forming a rolling lobe displaceable along said outside surface during displacement between extended and compressed conditions of said gas spring assembly.

12. A method of manufacturing a gas spring assembly, said method comprising:
a) providing a first end member and a second end member for said gas spring assembly;
b) forming a spring wall from an unreinforced thermoplastic material, said spring wall having a longitudinal length and extending peripherally about a longitudinally-extending axis by:
b1) forming a first annular zone along said longitudinal length of said spring wall from unreinforced thermoplastic elastomer material such that has a first nominal stiffness value; and
b2) forming a second annular zone along said longitudinal length of said spring wall from unreinforced thermoplastic elastomer material such that has a second nominal stiffness value that is at least 25 percent greater than said first nominal stiffness value; and,
c) securing said spring wall between said first and second end members such that a spring chamber is at least partially defined therebetween and such that upon displacement displacement of said gas spring assembly between extended and compressed conditions during use said first annular zone is capable of operating as a flex zone of said spring wall varying from a first cross-sectional shape to a second cross-sectional shape that is substantially different from said first cross-sectional shape and said second annular zone is capable of operating as a non-flex zone of said spring wall forming a substantially-rigid wall portion of said spring wall relative to said first annular zone having an approximately consistent cross-sectional shape.

13. A method according to claim 12, wherein said first annular zone in b1) is formed separately from said second annular zone in b2) and said method further comprises attaching said first and second annular zones to one another to at least partially form said spring wall.

14. A method according to claim 12, wherein forming said first annular zone of said spring wall in b1) includes forming said first annular zone from a first unreinforced thermoplastic elastomer material, and forming said second annular zone of said spring wall in b2) includes forming said second annular zone from a second unreinforced thermoplastic elastomer material that is different from said first unreinforced thermoplastic elastomer material.

15. A method according to claim 12, wherein forming said first annular zone of said spring wall in b1) includes forming said first annular zone at a first nominal thickness, and forming said second annular zone of said spring wall in b2) includes forming said second annular zone at a second nominal thickness that is at least 25 percent greater than said first nominal thickness.

16. A method according to claim 12, wherein forming said first annular zone of said spring wall in b1) includes forming one or more stiffness-altering features into said first annular zone to thereby at least partially establish said first nominal stiffness value.

17. A method according to claim 12 further comprising forming a third annular zone of said spring wall from unreinforced thermoplastic elastomer material such that said third annular zone has a third nominal stiffness value that is different from at least one of said first and second nominal stiffness values.

18. A method according to claim 17, wherein forming said first annular zone of said spring wall in b1) includes forming said first annular zone from a first unreinforced thermoplastic elastomer material, forming said second annular zone of said spring wall in b2) includes forming said second annular zone from a second unreinforced thermoplastic elastomer material that is different from said first unreinforced thermoplastic elastomer material, and forming said third annular zone of said spring wall includes forming said third annular zone from an unreinforced thermoplastic elastomer material that is different from at least one of said first and second unreinforced thermoplastic elastomer materials.

19. A method according to claim 17, wherein forming said first annular zone of said spring wall in b1) includes forming said first annular zone at a first nominal thickness, forming said second annular zone of said spring wall in b2) includes forming said second annular zone at a second nominal thickness that is at least 25 percent greater than said first nominal thickness, and forming said third annular zone of said spring wall includes forming said third annular zone at a third nominal thickness that is less than said second nominal thickness.

20. A method according to claim 17, wherein at least one of said first and second annular zones is formed separately from said third annular zone, and said method further comprises attaching said third annular zone to at least one of said first and second annular zones to at least partially form said spring wall.

* * * * *